UNITED STATES PATENT OFFICE.

EDWARD P. BECKWITH, OF SCHENECTADY, NEW YORK, ASSIGNOR TO GENERAL ELECTRIC COMPANY, A CORPORATION OF NEW YORK.

PROCESS OF PURIFYING TUNGSTIC ANHYDRID.

No. 926,084.      Specification of Letters Patent.      Patented June 22, 1909.

Original application filed April 23, 1906, Serial No. 313,198. Divided and this application filed September 16, 1907. Serial No. 392,999.

*To all whom it may concern:*

Be it known that I, EDWARD P. BECKWITH, a citizen of the United States, residing at Schenectady, county of Schenectady, State of New York, have invented certain new and useful Improvements in Processes of Purifying Tungstic Anhydrid, of which the following is a specification.

This invention relates to the purification of tungsten compounds, with especial reference to the production of material suitable for use in manufacture of incandescent lamp filaments, and is a division of application Serial No. 313,198, filed by me April 23, 1906.

My present invention can be carried out in the following manner:—A graphite tube about two feet long and two inches in diameter is placed horizontally and filled with crude tungsten oxid to about one-half its diameter. It is then heated to redness in any suitable manner and the vapor of carbon-tetrachlorid is passed through the tube, when the following reaction takes place:

$$WO_3 + CCl_4 = WOCl_4 + CO_2.$$

Also $$2WO_3 + CCl_4 = WO_2Cl_2 + CO_2.$$

$WOCl_4$ is a very volatile compound, subliming readily at 250° C. in the form of red needle shaped crystals. $WO_2Cl_2$ is a yellow compound slightly less volatile. They both pass over and collect on the walls of a receiving vessel suitably connected with the carbon tube. This operation is continued until all the $WO_3$ is converted into oxychlorid. Impurities non-volatile at red heat, such as carbon, silicon and some metal oxids, remain in the tube.

The chlorin compounds obtained by the above reaction are then treated with aqua regia, preferably of the following proportions: one part HCl, specific gravity 1.2; ten parts nitric acid, specific gravity 1.4. The containing flask is warmed in a steam bath and the acid is then diluted with an equal volume of water. On adding the acid, both oxychlorids are immediately converted to tungstic acid, which remains undissolved.

$$WOCl_4 + 2H_2 = WO_3 + 4HCl$$
$$WO_2Cl_2 + H_2O = WO_3 + 2HCl.$$

The tungstic oxid is filtered off hot and washed with acid until free from iron. Most metallic impurities which have sublimed with the oxychlorids pass into the filtrate. The tungstic oxid is then dissolved in ammonia and re-precipitated with dilute nitric acid. When filtered off, the oxid is dried by heating in a porcelain crucible to low redness for several hours. The tungstic oxid produced as above described is exceedingly pure, and furthermore, is in a very finely divided state, and therefore, especially serviceable for the manufacture of lamp filaments.

What I claim as new and desire to secure by Letters Patent of the United States, is,—

1. The process which consists in heating tungsten trioxid in vapor of carbon tetrachlorid to produce a volatile product and to separate impurities non-volatile at red heat.

2. The process which consists in heating tungsten oxid in the presence of vapor of carbon tetrachlorid to produce a volatile chlorin compound, subliming said compound and then treating the sublimate with aqua regia to convert it into tungstic acid.

3. The process which consists in treating tungstic trioxid with carbon tetrachlorid at a red heat to produce a volatile chlorin compound, condensing said chlorin compound and treating with aqua regia to produce tungstic acid, dissolving said acid in ammonia and re-precipitating with dilute nitric acid.

In witness whereof, I have hereunto set my hand this 13th day of September, 1907.

EDWARD P. BECKWITH.

Witnesses:
    DANIEL HAND,
    KATIE M. CALLAGHAN.